United States Patent
Iinuma et al.

(10) Patent No.: US 8,870,266 B2
(45) Date of Patent: Oct. 28, 2014

(54) VEHICLE REAR OUTLET STRUCTURE

(75) Inventors: Yusuke Iinuma, Zama (JP); Hideyuki Kawamata, Sagamihara (JP); Makoto Iijima, Atsugi (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 13/697,648

(22) PCT Filed: Apr. 6, 2011

(86) PCT No.: PCT/JP2011/058729
§ 371 (c)(1),
(2), (4) Date: Nov. 13, 2012

(87) PCT Pub. No.: WO2011/145404
PCT Pub. Date: Nov. 24, 2011

(65) Prior Publication Data
US 2013/0062907 A1 Mar. 14, 2013

(30) Foreign Application Priority Data

May 17, 2010 (JP) .................... 2010-113181

(51) Int. Cl.
*B60S 1/60* (2006.01)
*B62D 35/00* (2006.01)

(52) U.S. Cl.
CPC ............ *B62D 35/008* (2013.01); *B62D 35/007* (2013.01); *G60Q 1/0017* (2013.01)
USPC ........................ 296/181.5; 454/69; 296/208

(58) Field of Classification Search
USPC .............. 296/208, 180.1, 181.5, 190.09; 293/113; 280/782; 454/69
See application file for complete search history.

(56) References Cited

U.S. PATENT DOCUMENTS

| | | | | |
|---|---|---|---|---|
| 2,241,755 A | * | 5/1941 | Zaccone | 454/120 |
| 2,585,220 A | * | 2/1952 | Brezek | 180/68.1 |
| 4,441,752 A | * | 4/1984 | Buehrig | 296/181.5 |
| 4,838,603 A | * | 6/1989 | Masoero et al. | 296/180.1 |
| 5,184,832 A | * | 2/1993 | Miwa | 296/198 |

FOREIGN PATENT DOCUMENTS

| | | |
|---|---|---|
| DE | 102 33 041 A1 | 2/2004 |
| GR | 91 100 368 A | 6/1993 |
| JP | 55-155912 A * | 4/1980 |
| JP | 56-155912 | 11/1981 |

(Continued)

OTHER PUBLICATIONS

Supplementary European Search Report dated Apr. 2, 2014 (7 pgs.).

*Primary Examiner* — Jason S Morrow
*Assistant Examiner* — E Turner Hicks
(74) *Attorney, Agent, or Firm* — Foley & Lardner LLP (57) ABSTRACT

A vehicle rear outlet structure includes: an outer member constituting an outer surface of a rear vehicle body and defining a flow path space inside of the vehicle body; and a protrusion portion provided on an outer surface of the outer member to protrude in an outboard direction. The outer member is provided with an air outlet opening through which the flow path space and a space outside of the vehicle body communicate with each other. The protrusion portion is arranged forward of the air outlet opening in the vehicle longitudinal direction and continuously in a vertical direction of the vehicle, such that the flow of air flowing along the outer surface of the outer member sucks out air in the flow path space through the air outlet opening to an outboard side thereof.

10 Claims, 9 Drawing Sheets

(56) References Cited

FOREIGN PATENT DOCUMENTS

| JP | 1-170040 U | 11/1989 |
| JP | 2-59046 U | 4/1990 |
| JP | 7-25368 A | 1/1995 |
| JP | 2001-10403 A | 1/2001 |
| JP | 2002-19650 A | 1/2002 |
| JP | 2002019650 A * | 1/2002 |
| JP | 2004-210138 A | 7/2004 |
| JP | 2006-347385 A | 12/2006 |
| JP | 4321063 B2 | 6/2009 |
| JP | 2010-58639 A | 3/2010 |

* cited by examiner

VEHICLE REAR OUTLET STRUCTURE

TECHNICAL FIELD

The present invention relates to a vehicle rear outlet structure which can reduce air drag produced when an automobile is running, and, in particular, can reduce the occurrence of vortices in a region rearward of the vehicle rear surface.

BACKGROUND ART

Japanese Patent No. 4321063 discloses a vehicle structure in which disturbing means to disturb the flow of air is provided on each side surface of a rear part of a vehicle. In this vehicle structure, a rear fender panel mainly includes a rear fender panel main body having a side surface formed to be extended linearly in a vehicle longitudinal direction and a curved portion formed to be curved from a rear end of the rear fender panel main body in a vehicle inward direction. On an outer surface in the vicinity of a front end of the curved portion, a protruding portion as the disturbing means is formed in a protruding manner.

SUMMARY OF THE INVENTION

Technical Problem

However, the above-described vehicle structure has the problem that the flowing of a running air on the side surface sides of the vehicle into a rear surface side of the vehicle cannot be sufficiently prevented.

An object of the present invention is to provide a vehicle rear outlet structure which can improve aerodynamic performances of a vehicle by reducing the occurrence of vortices and the like in a region rearward of the vehicle rear surface when the vehicle is running.

Solution to Problem

One aspect of the present invention is a vehicle rear outlet structure which includes: an outer member constituting an outer surface of a rear vehicle body and defining a flow path space inside of the vehicle body; and a protrusion portion provided on an outer surface of the outer member to protrude in an outboard direction. The outer member is provided with an air outlet opening through which the flow path space and a space outside of the vehicle body communicate with each other. The protrusion portion is arranged forward of the air outlet opening in a vehicle longitudinal direction and continuously in a vertical direction of the vehicle, such that the flow of air flowing along an outer surface of the outer member sucks out air in the flow path space through the air outlet opening to an outboard side thereof.

BRIEF DESCRIPTION OF DRAWINGS

FIG. 4 is a side view of a rear part of the vehicle in which the vehicle rear outlet structure in FIG. 1 is provided. FIG. 4 schematically shows a region in which an air outlet opening exists as a region rearward of line A-A.

FIG. 9(a) shows the flow of air around a vehicle to which the vehicle rear outlet structure in FIG. 1 is not applied, and FIG. 9(b) shows the flow of air around a vehicle to which the vehicle rear outlet structure in FIG. 1 is applied.

DESCRIPTION OF EMBODIMENTS

Hereinafter, a vehicle rear outlet structure according to an embodiment of the present invention will be described with reference to the drawings. It should be noted that in the following description, "forward in the vehicle longitudinal direction" may be simply expressed as "forward", and "rearward in the vehicle longitudinal direction" may be simply expressed as "rearward". Moreover, "outer members" described below are members constituting outer surfaces of various portions of the vehicle (members which define the outer shape and profile of the vehicle). The outer surfaces of the outer members constitute a boundary surface between the space inside of the vehicle body and the space outside of the vehicle body. In the following description, "inside the boundary surface" is expressed as "inside of the vehicle body", and "outside the boundary surface" is expressed as "outside of the vehicle body". Further, "a direction from the outside of the vehicle body toward the inside of the vehicle body" is expressed as "an inboard direction", and "a direction from the inside of the vehicle body toward the outside of the vehicle body" is expressed as "an outboard direction".

First, referring to FIGS. 1 to 9, the overall configuration of the vehicle rear outlet structure according to this embodiment will be described.

Figure 4:
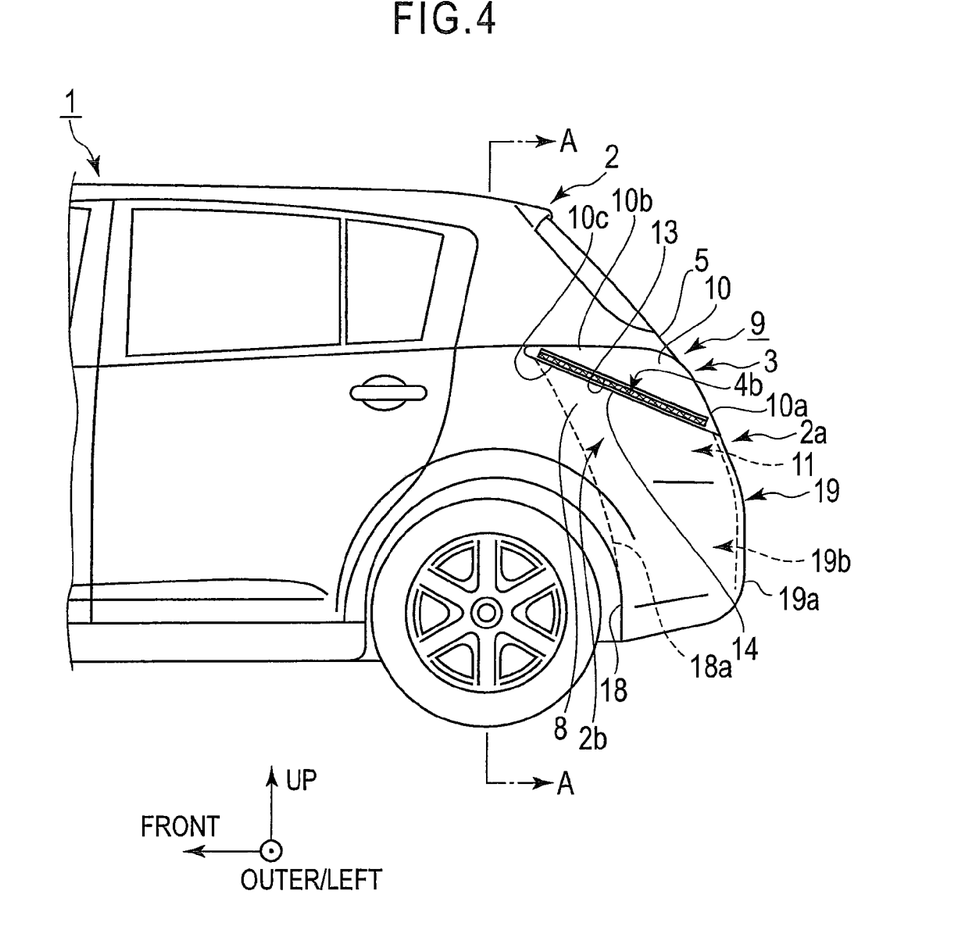

In an automobile 1 to which the vehicle rear outlet structure according to this embodiment is applied, as shown in FIG. 4, a pair of rear combination lamp devices 3 and 3 are attached to corner portions 9 and 9 located at left and right side edges of a rear end portion of a rear vehicle body 2, respectively.

Figure 1:
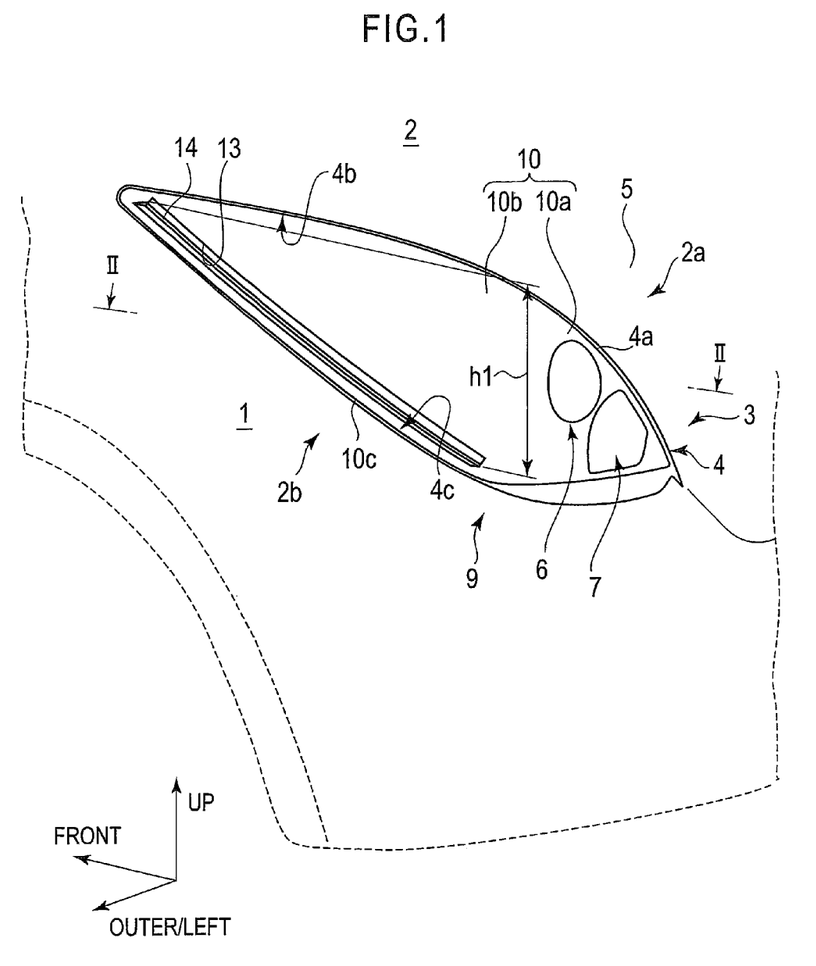
FIG. 1 is a perspective view of a principal part of a vehicle rear outlet structure according to an embodiment of the present invention as viewed from the left rear of a vehicle.
Figure 2:
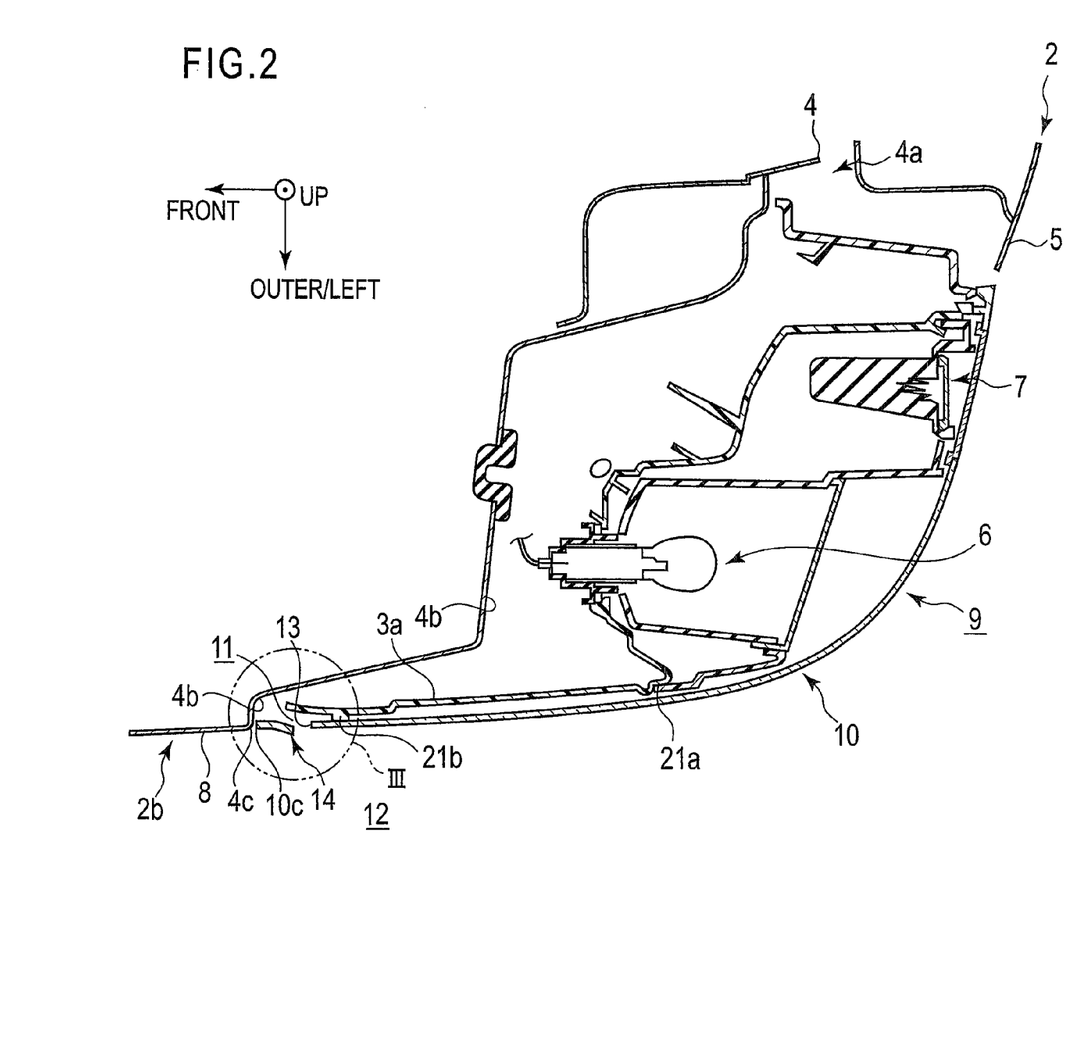
FIG. 2 is a cross-sectional view taken along the line II-II in FIG. 1.

As shown in FIGS. 1 and 2, a rear storage compartment opening 4 is formed in a rear surface 2a of the rear vehicle body 2. The rear storage compartment opening 4 is provided with a trunk lid member 5 in an openable and closable manner. Further, the rear combination lamp devices 3 and 3 are provided symmetrically left-right on the left and right sides such that the trunk lid member 5 is interposed between the rear combination lamp devices 3 and 3 in the vehicle width direction.

Here, the rear combination lamp device 3 disposed in a right rear end portion of the rear vehicle body 2 and the rear combination lamp device 3 disposed in a left rear end portion of the rear vehicle body 2 have left-right symmetrical configurations, and have substantially the same functions. In the following description of the configuration of the rear combination lamp device 3, the rear combination lamp device 3 in the left rear end portion of the rear vehicle body 2 will be mainly described, and the rear combination lamp device 3 in the right rear end portion of the rear vehicle body 2 will not be further described.

The rear combination lamp device 3 includes a lamp housing member 3a made of resin which constitutes part of a chassis. The lamp housing member 3a is fitted to one of installation recessed portions 4b and 4b respectively formed in recessed shapes in left and right edge portions 4a and 4a of the rear storage compartment opening 4.

Moreover, the rear combination lamp device 3 includes a cover lens member 10 made of transparent resin which is fitted to the outside of an outboard end of the lamp housing member 3a. The cover lens member 10 constitutes part of an outer member.

As shown in FIG. 4, these members, i.e., the lamp housing member 3a and the cover lens member 10, curve from the rear surface 2a of the rear vehicle body 2 to a side surface 2b thereof to extend in the forward direction of the vehicle. Front ends of the lamp housing member 3a and the cover lens member 10 are located near an outer surface of a rear fender panel member 8 constituting left and right side surfaces 2b and 2b. Moreover, in a horizontal section shown in FIG. 2, the lamp housing member 3a and the cover lens member 10 constitute the corner portion 9 having an outer shape which curves to convex in an outboard direction.

Moreover, a tail lamp 6, a stop lamp 7, and the like are integrally incorporated in the lamp housing member 3a. The tail lamp 6 is usually lighted during a night drive or the like to make the presence of the vehicle known to people around the vehicle. The stop lamp 7 is used to make braking visible to another vehicle following this vehicle.

The cover lens member 10 made of transparent resin is fitted to the outside of the lamp housing member 3a in a watertight state such that the lighting of each of the tail lamp 6, . . . , and the like is visible from the rear of the vehicle.

In the cover lens member 10, a lens rear face portion 10a and a lens side surface portion 10b are provided integrally and continuously with each other. An outer surface of the cover lens member 10 is formed in a curved shape along the corner portion 9 of the rear vehicle body 2.

The lens rear face portion 10a of the cover lens member 10 is located in the rear surface 2a of the rear vehicle body 2. An edge portion of the lens rear face portion 10a which is located inward in the vehicle width direction is formed such that the outer surface thereof is substantially flush with an outer surface of the trunk lid member 5 in the rear surface 2a of the rear vehicle body 2.

Moreover, the lens side surface portion 10b of the cover lens member 10 is located in the left side surface 2b of the rear vehicle body 2. The lens side surface portion 10b of the cover lens member 10 is provided to be curved from the lens rear face portion 10a integrally therewith and to extend in the forward direction of the vehicle along the left side surface 2b such that the lens side surface portion 10b is substantially flush with the outer surface of the rear fender panel member 8 provided in the left side surface 2b of the rear vehicle body 2.

Figure 5:
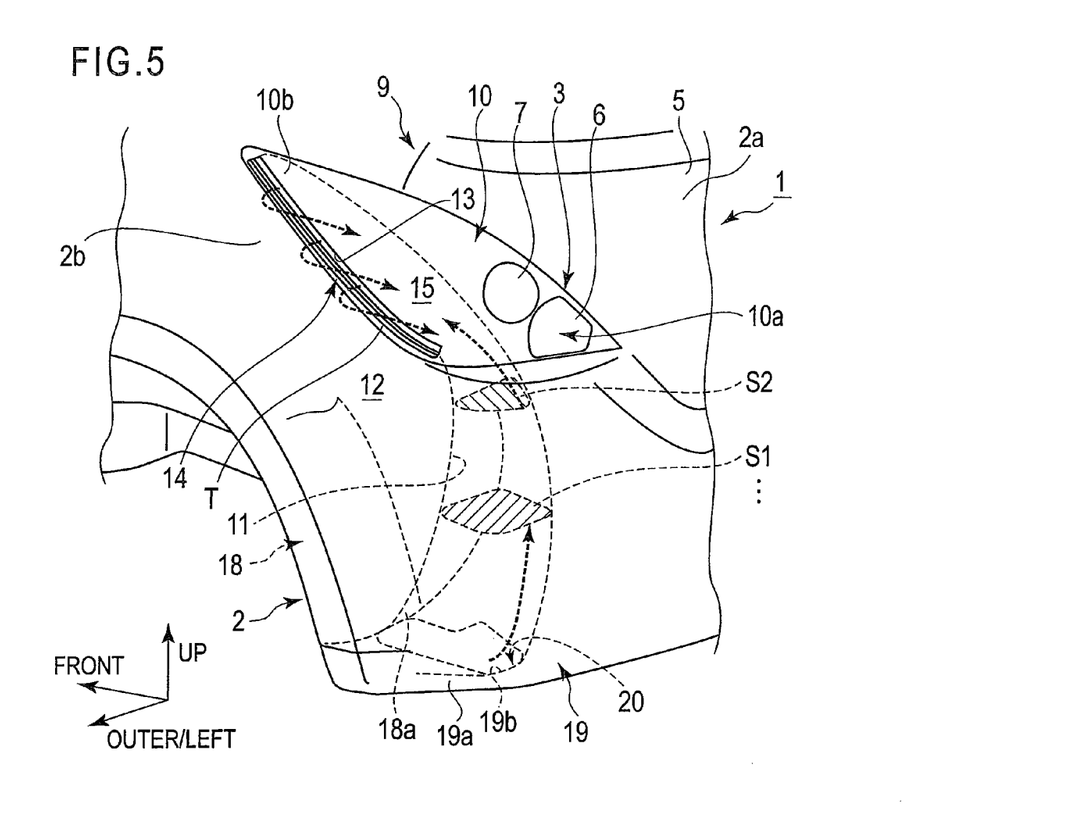
FIG. 5 is a partially sectional perspective view schematically showing the change in cross-sectional shape of a passage flow path formed by an internal flow path space formed on an inboard side of an outer member in the vehicle rear outlet structure in FIG. 1.

As shown in FIGS. 4 and 5, on the inboard side of the cover lens member 10, an internal flow path space (hereinafter also referred to as a flow path space inside of the vehicle body) 11 is formed between an outer panel member of the attachment recessed portion 4b and the cover lens member 10. The internal flow path space 11 has a flow path cross-sectional area allowing the passage of air.

Moreover, as shown in FIG. 1, a front end edge 10c of the lens side surface portion 10b of the cover lens member 10 is formed to be inclined downward in the rearward direction when viewed from a side of the vehicle. Further, the front end edge 10c of the cover lens member 10 is provided to extend along a front-side recessed portion 4c of the attachment recessed portion 4b provided in a recessed shape in the rear fender panel member 8.

Figure 3:
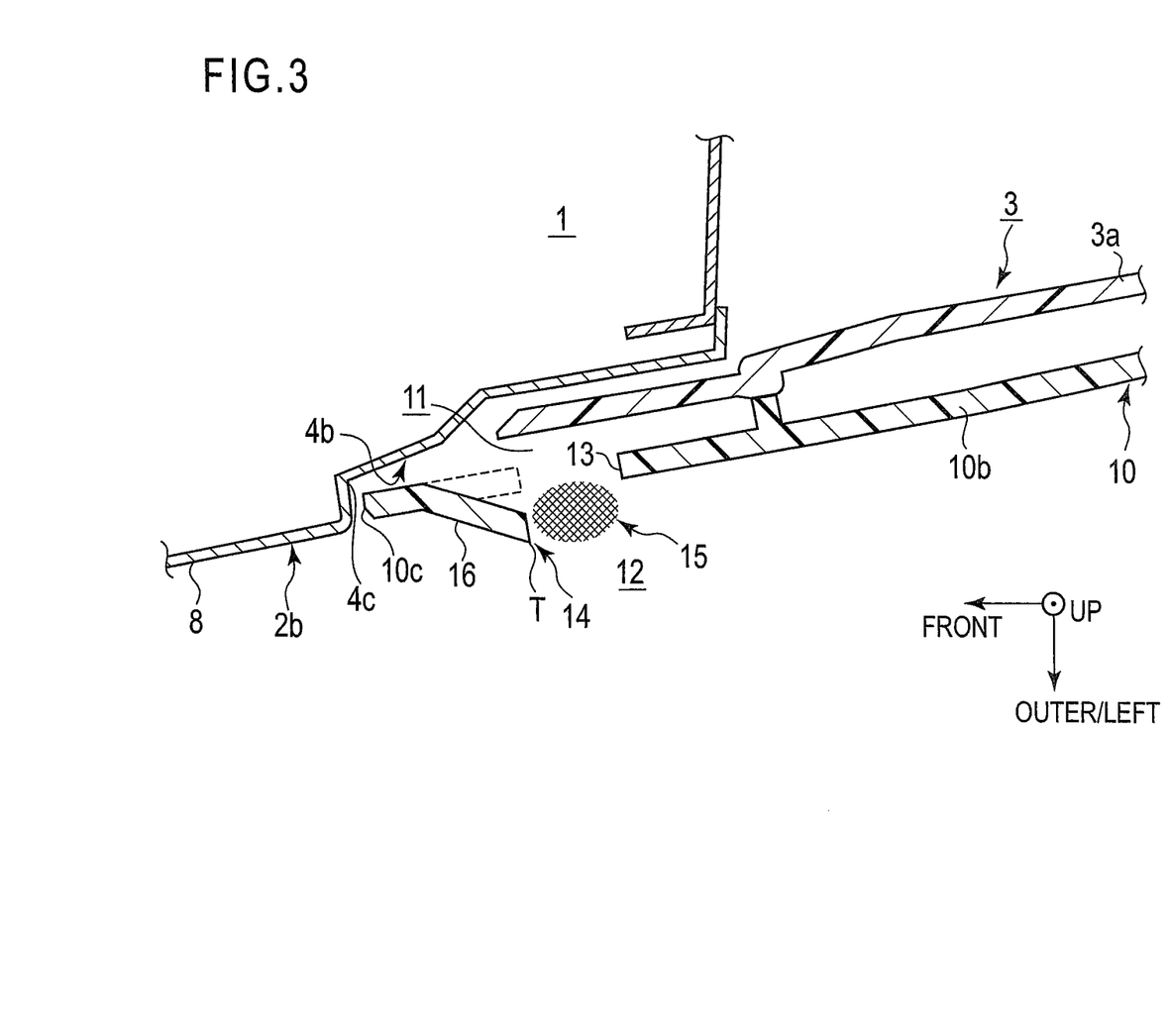
FIG. 3 is an enlarged view of a part denoted by III in FIG. 2.

As shown in FIGS. 2 and 3, in a portion near the front end edge 10c of the lens side surface portion 10b, an air outlet opening 13 is formed through which a space 12 outside of the vehicle body and the internal flow path space 11 communicate with each other. The air outlet opening 13 is provided to extend along the front end edge 10c over the almost entire length of the front end edge 10c measured in the vertical direction of the vehicle.

Figure 6:
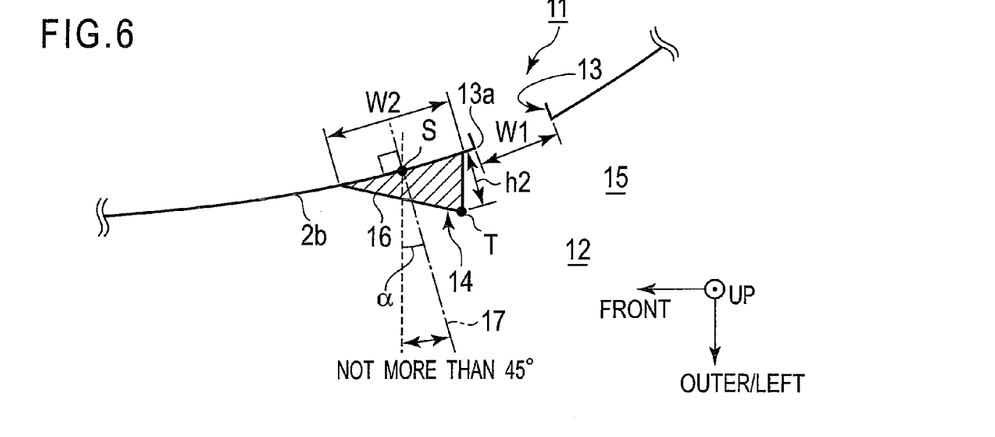
FIG. 6 is a horizontal cross-sectional view schematically showing the dimensional relationship between the air outlet opening and a protrusion portion in the vehicle rear outlet structure in FIG. 1.
Figure 8:
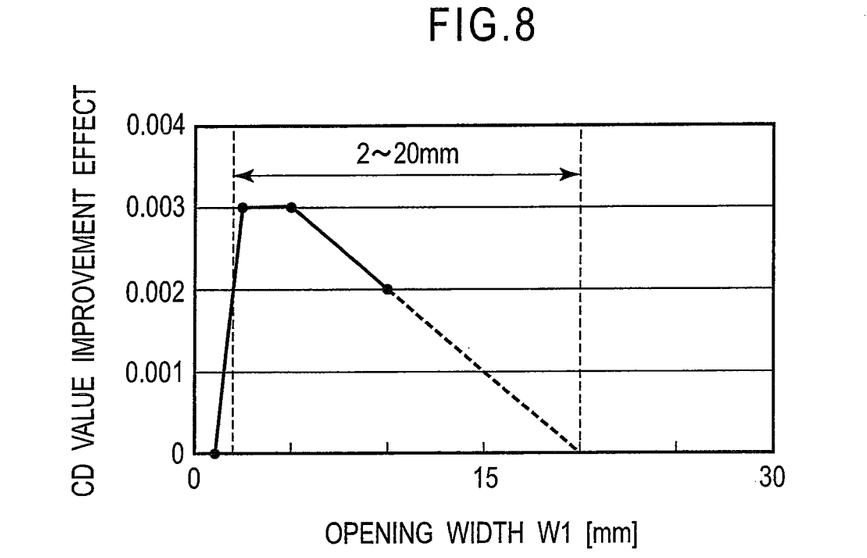
FIG. 8 is a graph obtained by plotting experimental data indicating the relationship between the opening horizontal width of the air outlet opening and CD value improvement effect in the vehicle rear outlet structure in FIG. 1.
Figure 9:
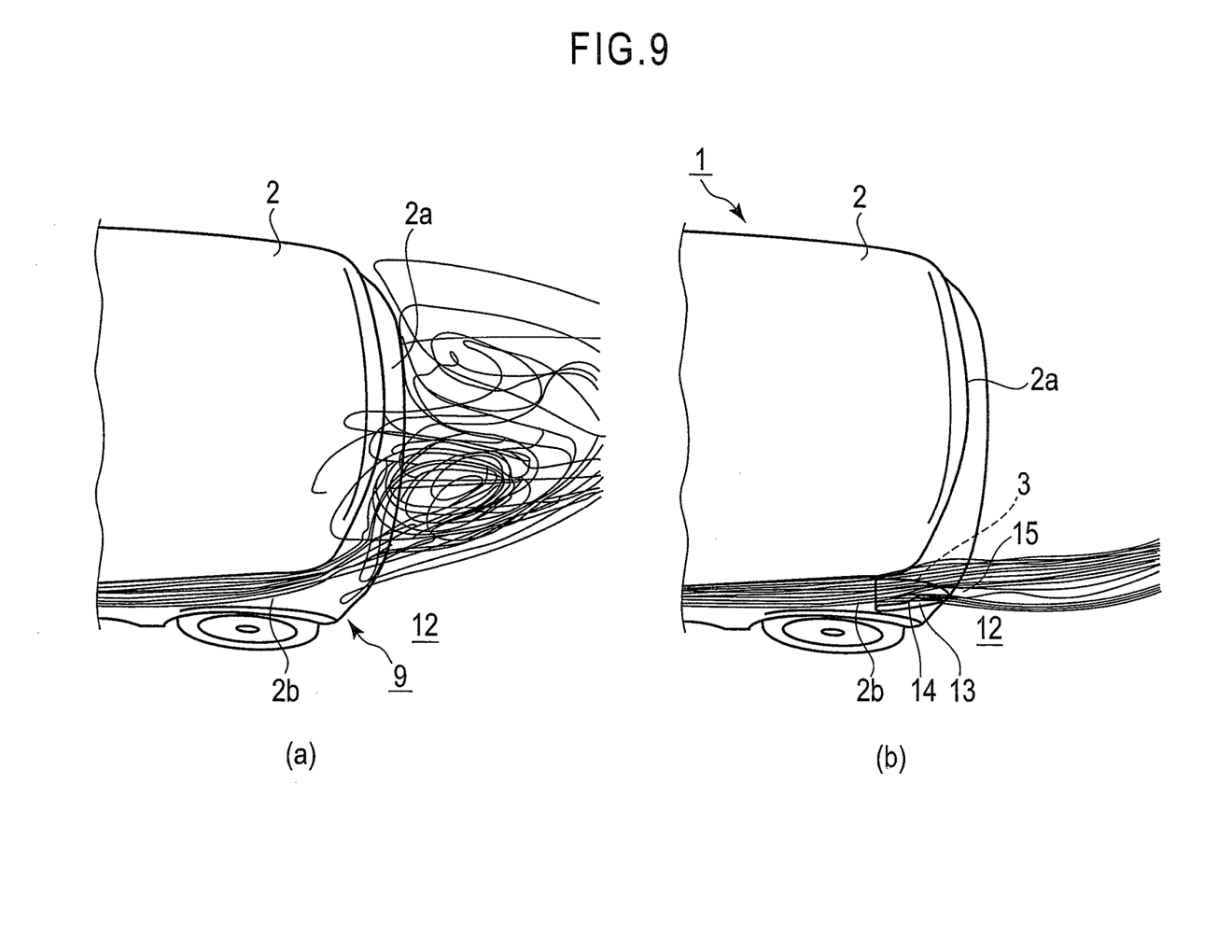
FIG. 9 is an analysis diagram showing the flow of air in a region rearward of the vehicle rear surface in a visualized manner.

The air outlet opening 13 is formed in the shape of a long, narrow opening having an inclined longitudinal axis. As shown in FIG. 6, an opening horizontal width W1 is substantially uniform over the almost entire length of the air outlet opening 13 measured in the vertical direction of the vehicle. The opening width W1 can be set in the range of 2 to 20 mm based on the following experimental data: as shown in FIG. 8, when the opening width W1 is set in the range of 2 to 20 mm, the air outlet opening 13 has the maximum contribution (CD value improvement effect) to aerodynamic effects which produce a favorable CD (coefficient of drag) value.

Moreover, in a front-side peripheral portion of the air outlet opening 13, a protrusion portion 14 provided to protrude in an outboard direction is provided integrally with the cover lens member 10. The protrusion portion 14 is formed along the front end edge 10c, and has a longitudinal axis inclined downward in the rearward direction.

In this embodiment, by modeling the corner portion 9 of the rear vehicle body 2, the lens side surface portion 10b of the cover lens member 10 is provided in the vicinity of a portion in which the rear vehicle body 2 starts being narrowed. Further, as shown in FIGS. 2 and 3, the protrusion portion 14 is disposed between the air outlet opening 13 and the front end edge 10c of the cover lens member 10 in the vicinity of a portion in which the rear vehicle body 2 starts being narrowed, i.e., as shown in FIG. 6, in a portion in which the angle of inclination α of the left side surface 2b of the rear vehicle body 2 in an inboard direction becomes not more than 45 degrees.

Figure 7:
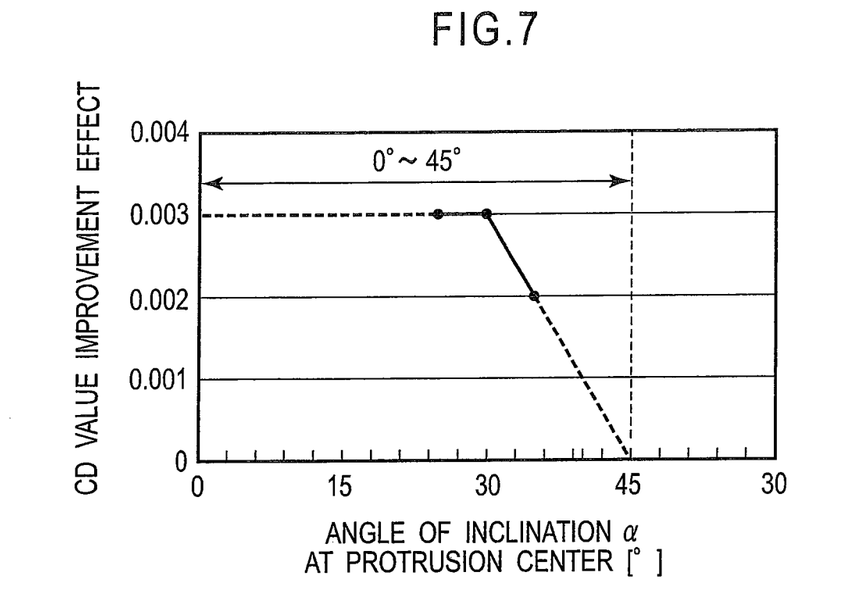
FIG. 7 is a graph obtained by plotting experimental data indicating the relationship between the position of a protrusion center and CD value improvement effect in the vehicle rear outlet structure in FIG. 1.

It should be noted that the angle of inclination α of a portion of the outer surface of the outer member in which the protrusion portion 14 is provided can be set in the range of 0 degrees to 45 degrees, more preferably in the range of 15 degrees to 40 degrees, based on the following experimental data: as shown in FIG. 7, when the angle of inclination α is set in the range of approximately 0 degrees (angle of inclination of a portion in which the rear vehicle body 2 starts being narrowed) to approximately 45 degrees, preferably in the range of approximately 15 degrees to approximately 40 degrees, the protrusion portion 14 has the maximum contribution to aerodynamic effects which produce a favorable CD value.

Moreover, as shown in FIG. 6, the protrusion portion 14 has a substantially triangular shape in a horizontal section, and has a ridge line which is located on the outboard side of the air outlet opening 13 and a front slope portion 16 in the shape of an inclined surface which is located on the opposite side of the ridge line from the air outlet opening 13, i.e., located forward of the ridge line.

The side surface of the rear fender panel member 8, which is an outer member constituting the side surfaces 2b of the rear vehicle body 2, recedes inward in the rearward direction (side surface of the rear fender panel member 8 is inclined inward in the vehicle width direction in the rearward direction). The angle between a side surface perpendicular line 17 and a line parallel to the vehicle width direction is equal to or less than 45 degrees. The lens side surface portion 10b of the cover lens member 10 is disposed adjacent to the side surface of the rear fender panel member 8, and is formed to be substantially flush with the side surface of the rear fender panel member 8 in the vicinity of the front end edge 10c of the cover lens member 10. Moreover, the protrusion portion 14 is provided along the front end edge 10c on the outer surface of the lens side surface portion 10b. Further, a protrusion center S, which is the center (center of a width in a horizontal section) of a horizontal width of the protrusion portion 14, is located in a portion in which the distance between the side surfaces 2b of the rear vehicle body 2 is narrowed in the rearward direction and in which the angle between the side surface perpendicular line 17 and a line parallel to the vehicle width direction is equal to or less than 45 degrees. It should be noted that the "side surface perpendicular line" means a line normal to the outer contour of the side surface of the rear fender panel member 8 in a horizontal section as shown in FIG. 6.

Moreover, the protrusion portion 14 is formed in the shape of an elongated protrusion such that a horizontal width (width in a horizontal section) W2 which is approximately equal to a width measured in the vehicle longitudinal direction is a substantially uniform width over the entire length h1 of the protrusion portion 14 measured in the vertical direction of the vehicle.

Furthermore, a top T (top T of the protrusion portion 14 in a horizontal section which is located farthest in the outboard direction) of the protrusion portion 14 is located rearward of the side surface perpendicular line 17 passing through the protrusion center S in the vehicle longitudinal direction. Thus, the angle of inclination of the front slope portion 16 is reduced to near the angle of inclination of a portion where the side surface, which is adjacent to the front slope portion 16, of the rear fender panel member 8 starts receding.

In this embodiment, the protrusion portion 14 makes an effect on the running air flowing along an outer surface of the side surface 2b of the rear vehicle body 2, and this causes the running air to form a negative-pressure region 15 located rearward of the protrusion portion 14 and located on the outboard side of the air outlet opening 13. Thus, this embodiment is configured such that the negative-pressure region 15 causes air in the internal flow path space 11 to be sucked out through the air outlet opening 13 to the space 12 outside of the vehicle body located on the outboard side. It should be noted that the "running air" means a relative air flow formed around the vehicle when the vehicle is running. Moreover, a "negative pressure" means a pressure lower than atmospheric pressure, and a "positive pressure" means a pressure higher than atmospheric pressure.

The protrusion portion 14 has a sheared and bent shape formed by integrally bending the front-side peripheral portion of the air outlet opening 13 from the position indicated by a dotted line to the position indicated by a solid line in FIG. 3 such that the rear end of the front-side peripheral portion of the air outlet opening 13 is located farthest in the outboard direction. As shown in FIG. 3, the sheared and bent portion has the same plate thickness as a normal portion in the vicinity of the front end edge 10c of the lens side surface portion 10b. This makes the direction of the running air flowing along the surface of the protrusion portion 14 different from the direction of the running air flowing along the outer surface of the outer member around the protrusion portion 14, and causes the negative-pressure region 15 to be formed on the outboard side of the air outlet opening 13 disposed adjacent to the protrusion portion 14 to be located inward from the protrusion portion 14 in the vehicle width direction (located on the inboard side of the protrusion portion 14) and rearward of the protrusion portion 14 in the vehicle longitudinal direction.

Moreover, as shown in FIG. 5, a lower portion of the internal flow path space 11 is formed between a back surface 18a of a rear wheel housing member 18 in the rear vehicle body 2 and a back surface 19b of a bumper fascia member 19a of a rear bumper member 19 extended in the vehicle width direction, which covers the rear vehicle body 2 as part of an outer member.

Furthermore, at a lower end of the internal flow path space 11, an air intake opening 20 formed in an underside of the vehicle body in the rear vehicle body 2 is provided for introducing air flowing along the underside of the vehicle body as the running air. The air intake opening 20 makes the space outside of the vehicle body lying along the underside of the vehicle body communicate with the internal flow path space 11 located above the space outside of the vehicle body and formed on the inboard side of the cover lens member 10.

Accordingly, the running air passing along the underside of the rear vehicle body 2 is introduced through the air intake opening 20 into the internal flow path space 11 to have a positive pressure at the back surface 19b of the bumper fascia member 19a. Further, the introduced air passes through the internal flow path space 11 to be sucked out through the air outlet opening 13 provided in the cover lens member 10 toward the negative-pressure region 15 located on the outboard side.

Moreover, in the internal flow path space 11 located on the inboard side of the bumper fascia member 19a and the cover lens member 10, the cross-sectional shape of an air passage flow path (passage through which air passes) is formed to have cross-sectional areas S1, S2, ... gradually decreasing in the upward direction of the vehicle body, i.e., toward the downstream in the direction of air passage, and is set such that the opening area of the air intake opening 20 and the cross-sectional areas S1, S2, ... of the passage flow path are larger than the opening area of the air outlet opening 13. Specifically, the cross-sectional shape of the passage flow path in which the air is introduced through the air intake opening 20, passes through the internal flow path space 11, and is then discharged to the negative-pressure region 15 located on the outboard side of the air outlet opening 13 is set such that the flow path cross-sectional area of the internal flow path space 11 is larger than the opening area of the air outlet opening 13.

Moreover, as shown in FIG. 2, in the rear combination lamp device 3, sealed junctions 21a and 21b allow the lamp housing member 3a and the cover lens member 10 to be connected and fixed to each other to close the rear combination lamp device 3 in a watertight state. Further, the air outlet opening 13 is provided along the front end edge 10c at a position (position closer to the peripheral edge of the cover lens member 10) located farther outward of a peripheral edge portion of the cover lens member 10 than the sealed junctions 21a and 21b.

Furthermore, in this embodiment, the protrusion portion 14 is provided to extend between the front end edge 10c and the front-side peripheral portion of the air outlet opening 13 integrally therewith.

Next, functions and effects of the vehicle rear outlet structure according to this embodiment will be described.

In the rear vehicle body 2 of the automobile 1 to which the vehicle rear outlet structure according to this embodiment is applied, the running air flows along the outer surface of the rear fender panel member 8 constituting the left and right side surfaces 2b and 2b, and is then smoothly guided along the front slope portion 16 of the protrusion portion 14 from the front end edge 10c of the cover lens member 10, which is provided to be substantially flush with the outer surface of the rear fender panel member 8 as shown in FIG. 3, to the top T (ridge line) of the protrusion portion 14.

Then, the running air passes over the top T located on a rear edge of the front slope portion 16 to smoothly depart from the outer surface of the lens side surface portion 10b. Thus, the negative-pressure region 15 is formed rearward of the protrusion portion 14, and air in the internal flow path space 11 is sucked out through the air outlet opening 13 toward the negative-pressure region 15 formed on the outboard side.

Further, the air sucked out through the air outlet opening 13 joins the running air flowing along the outer surface of the left and right side surfaces 2b and 2b of the rear vehicle body 2 as a flow which moves from the inboard side of the cover lens member 10 toward the outboard side thereof or a flow which moves from a side located inward in the vehicle width direction toward a side located outward with respect thereto. Thus, as shown in FIG. 9(b), the running air flowing toward the rear of the vehicle body is rectified to a smoother (less turbulent) flow compared to that of a vehicle without the protrusion portion 14 and the air outlet opening 13 shown in FIG. 9(a).

Accordingly, this embodiment can prevent the running air flowing along the side surface 2b of the rear vehicle body 2 of the automobile 1 toward the rear of the vehicle from flowing from the side surface 2b side into the rear surface 2a side at the corner portion 9 to generate vortices and the like in a region rearward of the vehicle rear surface as shown in FIG. 9(a). This can reduce a negative pressure acting on the vehicle rear surface and reduce an increase in air drag.

Moreover, in this embodiment, the air intake opening 20 is formed between the back surface 18a of the rear wheel housing member 18 for a rear tire and the back surface 19b of the bumper fascia member 19a in the underside of the vehicle body of the automobile 1, and the air which flows along the underside of the rear vehicle body 2 to be introduced through the air intake opening 20 passes through the internal flow path space 11 to be discharged from the air outlet opening 13 to the outboard side.

At this time, the pressure of the air in the internal flow path space 11 is a positive pressure, which is a pressure higher than that in the negative-pressure region 15 formed on the outboard side of the air outlet opening 13.

Moreover, the cross-sectional shape of the passage flow path in which air is introduced through the air intake opening 20, passes through the internal flow path space 11, and is then discharged to the negative-pressure region 15 located on the outboard side of the air outlet opening 13 is set such that the flow path cross-sectional area of the internal flow path space 11 is larger than the opening area of the air outlet opening 13 as shown in FIG. 5.

Also, in this embodiment, the cross-sectional shape of air passage flow path is formed to have cross-sectional areas gradually decreasing in the upward direction of the vehicle body, i.e., toward the downstream in the direction of air passage.

Accordingly, the difference in air pressure between the inside and outside of the air outlet opening 13 causes air given a positive pressure in the internal flow path space 11 to be more smoothly sucked out through the air outlet opening 13 toward the negative-pressure region 15 formed on the outboard side of the air outlet opening 13.

To evaluate effects of the vehicle rear outlet structure according to this embodiment on CD value, an experiment has been carried out using an automobile with a CD value of 0.3 and without the air outlet opening 13 and the protrusion portion 14. Specifically, air drag was measured for the cases where this automobile was provided with only the air outlet opening 13, provided with only the protrusion portion 14, and provided with both of the air outlet opening 13 and the protrusion portion 14 as in this embodiment, respectively. As a result, in the automobile provided with only the air outlet opening 13 and the automobile provided with only the protrusion portion 14, CD value improvement effect was 1.0% (Δ0.003) and 1.4% (Δ0.005), respectively. On the other hand, in the automobile 1 provided with the protrusion portion 14 and the air outlet opening 13 in combination, CD value improvement effect was 2.4% (Δ0.008). Thus, it was proved that in the case where the protrusion portion 14 and the air outlet opening 13 are provided in combination, CD value improvement effect is significantly improved compared to the case where only the air outlet opening 13 or the protrusion portion 14 is provided. This proved that a synergistic effect on CD value improvement can be obtained by combining the protrusion portion 14 and the air outlet opening 13.

Moreover, as shown in FIG. 6, in this embodiment, the protrusion center S, which is the center of the horizontal width of the protrusion portion 14, is located in a portion in which the distance between the side surfaces 2b of the rear vehicle body 2 is narrowed in the rearward direction and in which the angle between the side surface perpendicular line 17 to the outer surface of the lens side surface portion 10b of the cover lens member 10 and a line parallel to the vehicle width direction is equal to or less than 45 degrees.

Accordingly, the protrusion portion 14 can be easily formed integrally with the cover lens member 10 by, for example, as indicated by a dotted line in FIG. 3, shearing and bending a portion in the vicinity of the front end edge 10c which has the same plate thickness as the normal portion of the lens side surface portion 10b, and the amount (h2 in FIG. 6) by which the protrusion portion 14 protrudes from the side surface 2b can be ensured with a favorable material efficiency.

Moreover, as shown in FIG. 6, the protrusion portion 14 of this embodiment has a predetermined horizontal width W2 in the vehicle width direction in a horizontal section, and the top T of the protrusion portion 14 is located rearward of the side surface perpendicular line 17 passing through the protrusion center S in the vehicle width direction.

Accordingly, the amount by which the protrusion portion 14 protrudes from the side surface 2b can be set large while the angle of inclination of the front slope portion 16 is set small and the inclined surface of the front slope portion 16 is located near the outer surface of the side surface 2b of the rear vehicle body 2.

Also, in the protrusion portion 14 of this embodiment, the front slope portion 16 is formed by integrally bending the front-side peripheral portion of the air outlet opening 13 from the position indicated by a dotted line to the position indicated by a solid line in FIG. 3 to form a sheared and bent shape such that the rear end of the front-side peripheral portion of the air outlet opening 13 is located farthest in the outboard direction.

Accordingly, the negative-pressure region 15 can be widely provided not only in a region rearward of the top T of the protrusion portion 14 but also in regions located inward from the top T in the vehicle width direction and located on the inboard side of the top T, and the amount of air sucked out can be further increased.

Moreover, in this embodiment, the air outlet opening 13 and the protrusion portion 14 are provided in the rear combination lamp devices 3 and 3 located at left and right side edges of the rear end portion of the rear vehicle body 2.

Accordingly, additional members do not need to be added, and an increase in the number of parts can be prevented.

Also, in this embodiment, the air outlet opening 13 and the protrusion portion 14 are provided in the lens side surface portion 10b, of the cover lens member 10 constituting part of the rear combination lamp device 3 disposed in the rear vehicle body 2, which is provided to extend forward in the vehicle longitudinal direction along the left and right side surfaces 2b and 2b.

Accordingly, the air outlet opening 13 and the protrusion portion 14 can be easily disposed on each of the left and right side surfaces 2b and 2b of the rear end portion of the rear vehicle body 2.

Moreover, as shown in FIG. 2, in this embodiment, the sealed junctions 21a and 21b allow the lamp housing member 3a and the cover lens member 10 to be connected and fixed to each other to enclose the rear combination lamp device 3 in a watertight state. Further, the air outlet opening 13 is provided along the front end edge 10c at a position farther outward of the peripheral edge portion of the cover lens member 10 than the sealed junctions 21a and 21b.

Accordingly, it is possible to configure the air outlet opening 13 for discharging air while reliably ensuring the watertightness produced by the sealed junctions 21a and 21b doubly formed and to improve the degrees of freedom in setting the shape, quantity, and the like of the air outlet opening 13.

Also, in this embodiment, the protrusion portion 14 is provided to extend between the front end edge 10c of the lens side surface portion 10b and the front-side peripheral portion of the air outlet opening 13 integrally therewith.

Accordingly, even in the case where the air outlet opening 13 is formed near the front end edge 10c, a reduction in the rigidity of the cover lens member 10 in the vicinity of the front end edge 10c can be made small.

EXAMPLE 1

Figure 10:
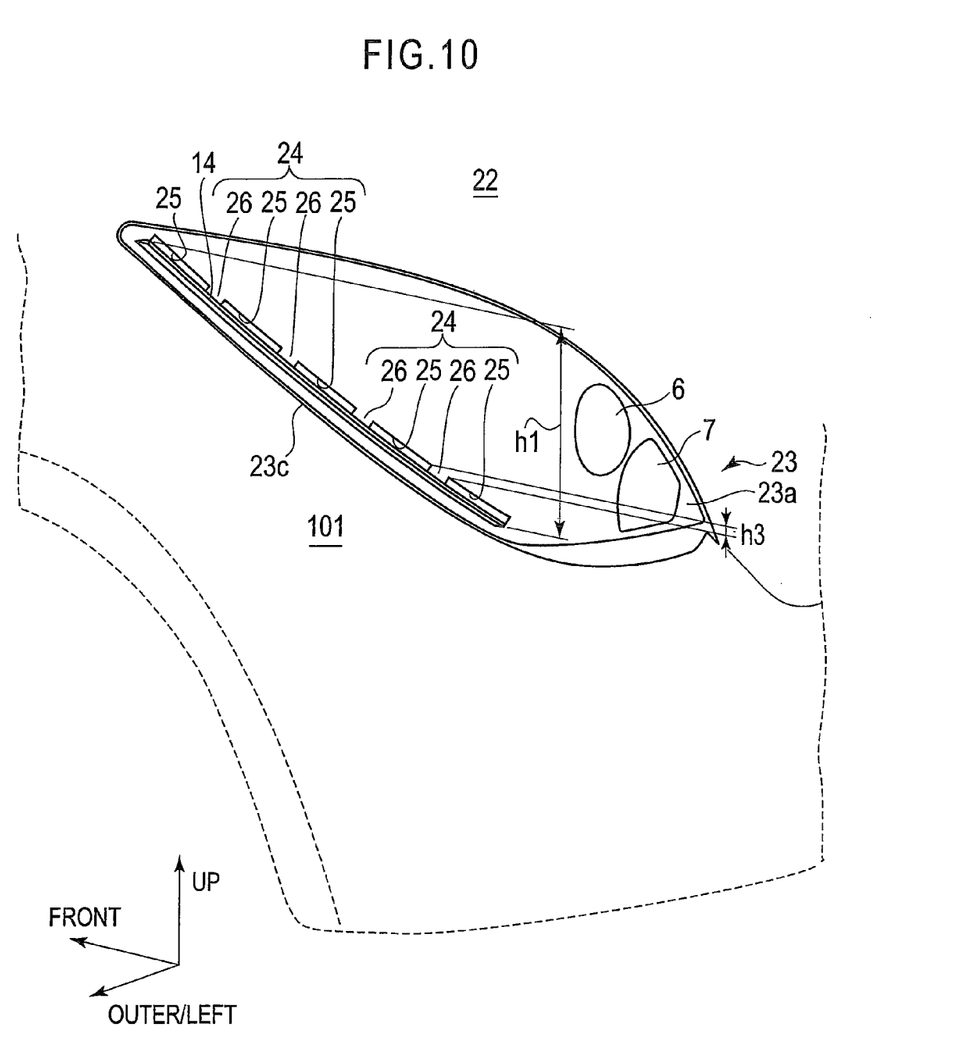
FIG. 10 is a perspective view of a principal part of a vehicle rear outlet structure according to example 1 of the present invention as viewed from the left rear of a vehicle.

FIG. 10 shows a vehicle rear outlet structure according to example 1 of the present invention.

It should be noted that in the following description, portions which are the same as or equivalent to those of the vehicle rear outlet structure of the above-described embodiment are denoted by the same reference numerals.

First, structural differences will be described. In the vehicle rear outlet structure of example 1, the air outlet openings 13 and 13 of the aforementioned embodiment are replaced by air outlets 24 and 24. The air outlets 24 and 24 are obtained by forming multiple air outlet openings 25 . . . formed at regular intervals in a cover lens member 23a of each of the left and right rear combination lamp devices 23 and 23 provided in a rear vehicle body 22 of an automobile 101.

The air outlet openings 25 . . . are tandemly disposed adjacent to each other in the extending direction of the protrusion portion 14. Each of the air outlet openings 25 . . . has the shape of a long opening, and the air outlet openings 25 . . . are formed to constitute the shape of a broken line when viewed from a side of the vehicle.

Moreover, between these air outlet openings 25 and 25, reinforcing members 26, 26, . . . are provided. With regard to the direction of the opening width of the air outlet openings 25, the reinforcing members 26, 26, . . . are bridged between edge portions of opposite internal side surfaces of the air outlet openings 25 such that the edge portions of opposite internal side surfaces of the air outlet opening 25 are integrally connected. With regard to the tandem direction, the reinforcing members 26, 26, . . . are disposed to alternate with the air outlet openings 25, 25, . . . .

These reinforcing members 26 . . . are formed integrally with the protrusion portion 14 such that the protrusion portion 14 provided along a front end edge 23c of the cover lens member 23a attached to the rear vehicle body 22 is supported by the reinforcing members 26 . . . at multiple positions.

Moreover, a dimension h3 of each of the reinforcing members 26 . . . measured in the vertical direction of the vehicle is not more than approximately 20 mm so that the discharge of air from the air outlet openings 25 and 25 may not be disturbed. The air outlet openings 25 and 25 disposed adjacent to each other are formed such that upper and lower end portions thereof overlap each other in a horizontal direction, i.e., such that an upper end portion of the rear-side air outlet opening 25 of two air outlet openings 25 and 25 disposed adjacent to each other is higher than a lower end portion of the front-side air outlet opening 25 thereof in the vertical direction of the vehicle.

Next, functions and effects of the vehicle rear outlet structure of example 1 will be described.

In example 1, the air outlet 24, in which the multiple air outlet openings 25 . . . are formed at regular intervals, is formed along the front end edge 23c of the cover lens member 23a. Further, the protrusion portion 14 is disposed near the front end edge 23c, and the reinforcing members 26, 26, . . . are formed between the air outlet openings 25 and 25 to integrally connect the edge portions of opposite internal side surfaces of the air outlet openings 25 and 25 in the direction of the opening width.

Accordingly, in addition to functions and effects similar to those of the vehicle rear outlet structure of the aforementioned embodiment, example 1 has the effect of improving the strength of attachment of the rear combination lamp device 23, the cover lens member 23a, and the like to the rear vehicle body 22 despite the air outlet 24 including the multiple air outlet openings 25 . . . , because the front end edge 23c having the protrusion portion 14 is supported by the reinforcing members 26, 26, . . . at multiple positions.

Other components and effects are the same as those of the aforementioned embodiment, and therefore will not be further described.

EXAMPLE 2

Figure 11:
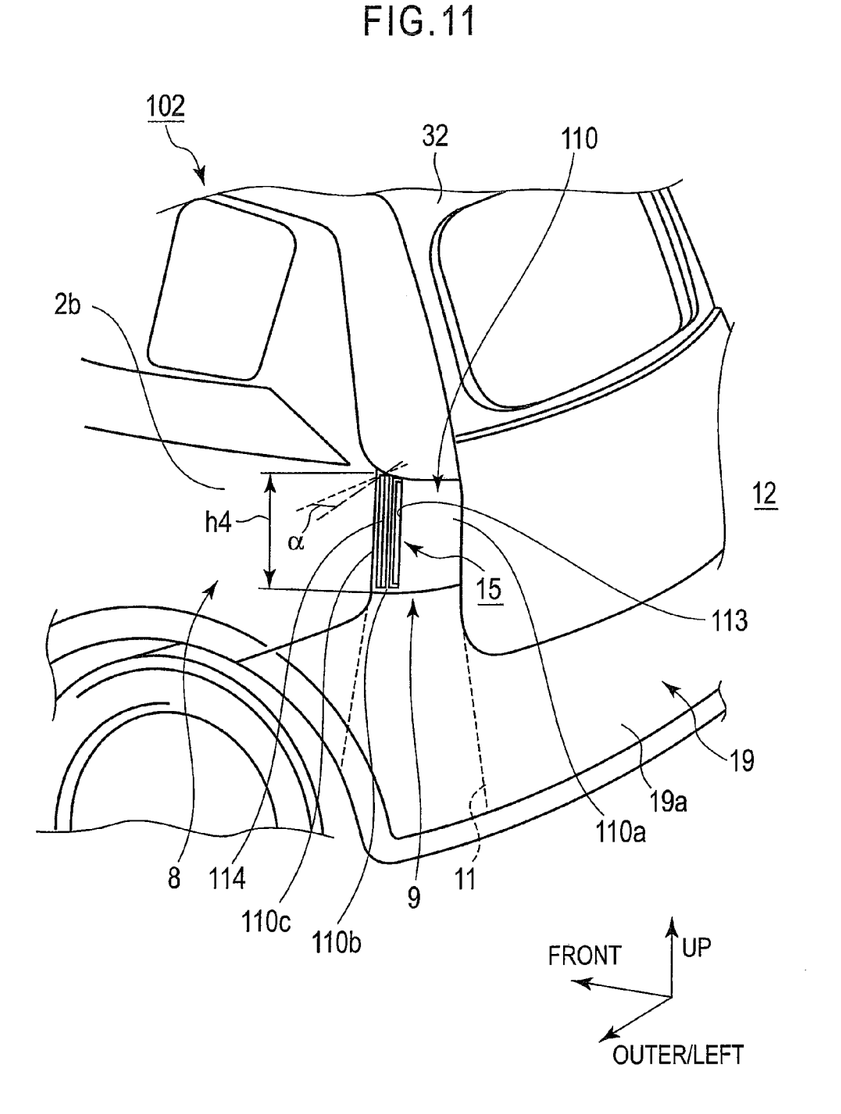
FIG. 11 is a perspective view of a principal part of a vehicle rear outlet structure according to example 2 of the present invention as viewed from the left rear of a vehicle.

FIG. 11 shows a vehicle rear outlet structure according to example 2 of the present invention.

It should be noted that in the following description, portions which are the same as or equivalent to those of the vehicle rear outlet structure of the above-described embodiment are denoted by the same reference numerals.

First, structural differences will be described. In the vehicle rear outlet structure of this example 2, corner outer panel members 110 and 110 as portions of outer members are installed under rear pillars in the corner portions 9 and 9 located on left and right side edges of a rear vehicle body 32 of an automobile 102, respectively.

The corner outer panel member 110 includes a panel rear face portion 110a and a panel side surface portion 110b provided along a curved shape of the corner portion 9 and 9 integrally and continuously with each other.

An outer surface of the panel side surface portion 110b is formed to be substantially flush with the outer surface of the rear fender panel member 8 in the vicinity of a front end edge 110c of the panel side surface portion 110b. The panel side surface portion 110b is provided to extend forward along a side surface of the rear vehicle body 32, and has a substantially constant vertical dimension h4 over the entire length of the panel side surface portion 110b measured in the vehicle longitudinal direction.

Moreover, in the vicinity of the front end edge 110c of the panel side surface portion 110b, an air outlet opening 113 through which the space 12 outside of the vehicle body and the internal flow path space 11 communicate with each other is formed over the almost entire length of the front end edge 110c measured in the vertical direction of the vehicle.

Further, in a front-side peripheral portion of the air outlet opening 113, a protrusion portion 114 provided to protrude in an outboard direction extends in the vertical direction.

As shown in FIG. 11, by modeling the corner portion 9 of the rear vehicle body 32, the protrusion portion 114 is disposed between the air outlet opening 113 and the front end edge 110c of the panel side surface portion 110b in the vicinity of a portion in which the rear vehicle body 32 starts being narrowed, i.e., in a portion in which the angle of inclination $\alpha$ of the panel side surface portion 110b in the rear vehicle body 2 inward in the vehicle width direction is not more than 45 degrees.

Next, functions and effects of the vehicle rear outlet structure of example 2 will be described.

In example 2, the protrusion portion 114 of the panel side surface portion 110b causes the running air to smoothly depart from the outer surface of the panel side surface portion 110b. Thus, the negative-pressure region 15 is formed at a position rearward of the protrusion portion 114 and located on the outboard side of the air outlet opening 113.

Accordingly, air in the internal flow path space 11 is smoothly sucked out through the air outlet opening 113 toward the space 12 outside of the vehicle body.

Further, the air sucked out through the air outlet opening 113 joins the running air flowing along the outer surface of the left and right side surfaces 2b and 2b of the rear vehicle body 32 as a flow which moves from the inboard side of the panel side surface portion 110b toward the outboard side thereof or a flow which moves from a side located inward in the vehicle width direction toward a side located outward with respect thereto. Thus, the running air flowing toward the rear of the vehicle body is rectified to a smoother (less turbulent) flow.

Moreover, in example 2, the air outlet opening 113 and the protrusion portion 114 are provided in the corner outer panel member 110 as part of an outer member provided under the rear pillar.

Accordingly, in addition to functions and effects similar to those of the vehicle rear outlet structures of the aforementioned embodiment and example 1, example 2 has the effect that the number of parts is not increased because additional parts do not need to be added.

Moreover, since the air outlet opening 113 and the protrusion portion 114 do not need to be provided in the cover lens member 10 of the aforementioned embodiment, the degrees of freedom in arrangement and configuration, such as the modeling of the rear combination lamp device, are improved.

Other components and effects are the same as those of the aforementioned embodiment and example 1, and therefore will not be further described.

Although the embodiment and examples 1 and 2 of the present invention have been described above, the embodiment and the like are merely illustrative examples described to facilitate the understanding of the present invention, and the present invention is not limited to the embodiment and the like. The technical scope of the present invention is not limited to specific technical matters disclosed in the above-described embodiment and the like, and includes various modifications, alterations, substitutional techniques, and the like capable of being readily derived therefrom.

For example, in the aforementioned embodiment and examples 1 and 2, as an example of the protrusion portion 14, a protrusion portion has been described which is provided to extend along the front end edge 10c of the cover lens member 10 or the front-side peripheral portion of the air outlet opening 13 and which has a longitudinal axis inclined downward in the rearward direction. However, the present invention is not particularly limited to this. The shape, quantity, arrangement position, and material of the protrusion portion 14 are not particularly limited. For example, multiple protrusion portions 14 may be provided.

Moreover, in the aforementioned embodiment and examples 1 and 2, as an example of an air outlet opening, the air outlet opening 13 in the shape of a long opening formed rearward of the protrusion portion 14 has been described. However, the present invention is not particularly limited to this. The shape, quantity, and combination of air outlet openings are not particularly limited. For example, the opening shape of the air outlet opening 13 may be other shape such as a circular, oval, or elliptic shape.

Furthermore, in the aforementioned embodiment and examples 1 and 2, as an example of a location to which the vehicle rear outlet structure is applied, the rear combination lamp devices 3 and 23 and the corner outer panel member 110 for a vehicle have been described. However, the present invention is not particularly limited to this. The vehicle rear outlet structure may be provided anywhere in an outer member in a rear vehicle body, such as a rear combination lamp device in which other functional lamp such as a turn signal lamp is housed, a panel member constituting a rear end edge of a roof portion of the rear vehicle body, or part of a rear high-mounted stop lamp device.

This application claims the benefit of priority to Japanese Patent Application No. 2010-113181, filed on May 17, 2010, the entire disclosures of which are incorporated herein by reference.

INDUSTRIAL APPLICABILITY

According to the present invention, a flow of air flowing along the outer surface of the outer member forms a negative-pressure region at a position rearward of the protrusion portion and located on the outboard side of the air outlet opening. Accordingly, air in the internal flow path space is sucked out through the air outlet opening to the outboard side thereof, and joins the running air flowing along the outer surface of the outer member from the inboard side thereof. Accordingly, the present invention can prevent the flowing of the running air on the side surface side of the vehicle into the rear surface side thereof and reduce the occurrence of vortices and the like in a region rearward of the vehicle rear surface. Thus, an increase in air drag on the vehicle can be prevented.

REFERENCE SIGNS LIST 1, 101, 102 automobile
2, 22, 32 rear vehicle body 2a rear surface
2b, 2b left and right side surfaces
3, 3 rear combination lamp device
3a, 3a lamp housing member
10, 23a cover lens member (part of outer member)
10c front end edge
11 internal flow path space
13, 25, 113 space outside of the vehicle body
13, 25, 113 air outlet opening
14, 114 protrusion portion
16 front slope portion
19a bumper fascia member (part of outer member)
110 corner outer panel member (part of outer member)

The invention claimed is:

1. A vehicle rear outlet structure comprising:
an outer member constituting an outer surface of a rear vehicle body and defining a flow path space inside of the vehicle body; and
a protrusion portion provided on an outer surface of the outer member so as to protrude in an outboard direction,
wherein the flow path space communicates with an air intake opening configured to introduce air flowing along an underside of the vehicle body,
wherein the air intake opening is formed between a back surface of a rear wheel housing member and a back surface of a rear bumper member,
wherein the outer member is provided with an air outlet opening through which the flow path space and a space outside of the vehicle body communicate with each other, and the air outlet opening is disposed on a side surface of the outer member, and
wherein the protrusion portion is arranged forward of the air outlet opening in a vehicle longitudinal direction and continuously in a vertical direction of the vehicle, the protrusion portion being disposed adjacent to the air outlet opening in a front-side peripheral portion of the air outlet opening, such that a flow of air flowing along the outer surface of the outer member sucks out air in the flow path space through the air outlet opening to an outboard side thereof.

2. The vehicle rear outlet structure according to claim 1, wherein
the protrusion portion has a substantially triangular shape in a horizontal section, and has a ridge line which is located on the outboard side of the air outlet opening and a front slope portion shaped as an inclined surface which is located on an opposite side of the ridge line from the air outlet opening.

3. The vehicle rear outlet structure according to claim 1, wherein
a protrusion center, which is a center of a horizontal width of the protrusion portion, is located in a portion in which a distance between side surfaces of the rear vehicle body is narrowed in a rearward direction and in which an angle between a side surface perpendicular line and a line parallel to a vehicle width direction is equal to or less than 45 degrees.

4. The vehicle rear outlet structure according to claim 3, wherein
the protrusion portion has a predetermined width in a horizontal section, and a top of the protrusion portion is located rearward of the side surface perpendicular line passing through the protrusion center in the vehicle longitudinal direction.

5. The vehicle rear outlet structure according to claim 1, wherein
the protrusion portion is formed by integrally bending the front-side peripheral portion of the air outlet opening, and
the protrusion portion forms a negative-pressure region located rearward of the protrusion portion in the vehicle longitudinal direction and located on the outboard side of the air outlet opening.

6. The vehicle rear outlet structure according to claim 1, wherein
the air outlet opening and the protrusion portion are located on each of left and right side surfaces of the rear vehicle body.

7. The vehicle rear outlet structure according to claim 6, wherein
a rear combination lamp device as the outer member is provided in the rear vehicle body,
the rear combination lamp device comprises a lens side surface portion provided along a side surface of the rear vehicle body so as to extend forward in the vehicle longitudinal direction, and
the air outlet opening and the protrusion portion are provided in the lens side surface portion.

8. The vehicle rear outlet structure according to claim 1, wherein
a cross-sectional shape of a passage flow path in which air is introduced from the air intake opening, passes through the flow path space, and is discharged to a negative-pressure region located on the outboard side of the air outlet opening is set such that a flow path cross-sectional area of the flow path space is larger than an opening area of the air outlet opening.

9. The vehicle rear outlet structure according to claim 7, wherein
the rear combination lamp device comprises a lamp housing member and a cover lens member configured to be fitted to an outside of the lamp housing member, and
the air outlet opening is provided in a peripheral edge portion of the cover lens member, the peripheral edge portion being located at a position outward from a junction between the lamp housing member and the cover lens member.

10. The vehicle rear outlet structure according to claim 1, wherein
a plurality of the air outlet openings are formed along an extending direction of the protrusion portion, and
a reinforcing member configured to support the protrusion portion is provided between the plurality of air outlet openings.

* * * * *